United States Patent
Agrawal et al.

(10) Patent No.: US 9,116,803 B1
(45) Date of Patent: Aug. 25, 2015

(54) PLACEMENT OF VIRTUAL MACHINES BASED ON PAGE COMMONALITY

(75) Inventors: Mukund Agrawal, Maharashtra (IN); Anindya Banerjee, Pune (IN); Shriram Wankhade, Pune (IN); Dilip Madhusudan Ranade, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 630 days.

(21) Appl. No.: 13/249,435

(22) Filed: Sep. 30, 2011

(51) Int. Cl.
G06F 9/455 (2006.01)
G06F 11/07 (2006.01)

(52) U.S. Cl.
CPC ........ *G06F 11/0751* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| 8,490,091 | B2 * | 7/2013 | Bozek et al. | 718/1 |
|---|---|---|---|---|
| 2007/0136721 | A1 * | 6/2007 | Dunshea et al. | 717/174 |
| 2008/0005521 | A1 * | 1/2008 | Cholleti et al. | 711/170 |
| 2008/0271017 | A1 * | 10/2008 | Herington | 718/1 |
| 2009/0070771 | A1 * | 3/2009 | Yuyitung et al. | 718/105 |
| 2009/0204718 | A1 * | 8/2009 | Lawton et al. | 709/230 |
| 2010/0107159 | A1 * | 4/2010 | Radhakrishnan et al. | 718/1 |
| 2010/0299667 | A1 * | 11/2010 | Ahmad et al. | 718/1 |
| 2011/0131571 | A1 * | 6/2011 | Heim | 718/1 |
| 2011/0320682 | A1 * | 12/2011 | McDougall et al. | 711/6 |
| 2012/0011508 | A1 * | 1/2012 | Ahmad | 718/1 |
| 2012/0023493 | A1 * | 1/2012 | Mori | 718/1 |
| 2012/0054411 | A1 * | 3/2012 | Agesen | 711/6 |
| 2012/0084782 | A1 * | 4/2012 | Chou et al. | 718/102 |
| 2012/0089764 | A1 * | 4/2012 | Baskakov et al. | 711/6 |
| 2012/0096457 | A1 * | 4/2012 | Gupta et al. | 718/1 |
| 2012/0272244 | A1 * | 10/2012 | Bozek et al. | 718/1 |
| 2013/0047160 | A1 * | 2/2013 | Conover | 718/1 |
| 2013/0179971 | A1 * | 7/2013 | Harrison | 726/23 |

* cited by examiner

*Primary Examiner* — Camquy Truong
*Assistant Examiner* — Mehran Kamran
(74) *Attorney, Agent, or Firm* — Campbell Stephenson LLP

(57) ABSTRACT

Various systems and methods for placing a virtual machine on one of a plurality of candidate physical machines. For example, one method can involve generating a list that comprises entries for a virtual machine. Each entry in the list indicates a portion of data that is associated with the virtual machine. The method then involves calculating a number of common entries between the list and each of a plurality of candidate lists, where a common entry is an entry that is included in the respective candidate list and in the list. Each candidate list is associated with a computing device. In response to detecting which candidate list has the most common entries, the method involves assigning the virtual machine to the computing device associated with that candidate list.

11 Claims, 11 Drawing Sheets

PLACEMENT OF VIRTUAL MACHINES BASED ON PAGE COMMONALITY

FIELD OF THE INVENTION

This invention relates to data processing systems, and in particular, to managing virtual data processing systems.

DESCRIPTION OF THE RELATED ART

Using virtual machines to provide the functionality ordinarily provided by physical computing devices is known as virtualization and is becoming increasingly common. One application of virtualization is the simplification of data center management.

Another emerging trend in modern computing is cloud computing. Cloud computing involves cloud vendors providing computing resources, such as storage, to customers on a pay-for-service basis. This enables an enterprise, for example, to use computing resources without having to acquire and maintain the physical computing assets, e.g., servers, associated with the computing resources. Instead, the enterprise can contract with a cloud vendor for computing resources. The enterprise can specify the quantity and characteristics of the computing resources the enterprise wishes to use.

Cloud vendors use virtual machines to provide services to a large number of users. Cloud vendors can dynamically provision, or reconfigure, their physical resources to serve the changing needs of large numbers of customers. When setting up a new virtual machine on one of a plurality of physical machines, a cloud vendor determines which physical machine should host the new virtual machine. Various criteria can be considered in making this determination, such as available network transmission bandwidth or memory bandwidth on a given physical machine, or the performance characteristics of the physical machine, such as processor speed. It is desirable that virtual machines be placed on physical machines such that the performance of the virtual machines is maximized while the amount of physical resources consumed by the virtual machines is minimized.

SUMMARY OF THE INVENTION

Various systems and methods for placing a virtual machine on one of a plurality of candidate physical machines are disclosed. For example, one method can involve generating a list that comprises entries for a virtual machine. Each entry in the list indicates a portion of data that is associated with the virtual machine. The method then involves calculating a number of common entries between the list and each of a plurality of candidate lists, where a common entry is an entry that is included in the respective candidate list and in the list. Each candidate list is associated with a computing device. In response to detecting which candidate list has the most common entries, the method involves assigning the virtual machine to the computing device associated with that candidate list.

In an embodiment, each entry in a candidate list indicates a portion of data associated with a second virtual machine. The second virtual machine is implemented on a computing device that is associated with one of the candidate lists.

In order to generate the list, a number of techniques can be used. One method traps a memory call made by the virtual machine. The memory call identifies a requested portion of data, e.g. a portion of data that should be loaded into the memory of the computing device on which the virtual machine is implemented. The method involves calculating a fingerprint for the requested portion of data and including the fingerprint in an entry in the list. In an embodiment generating the list involves predicting a portion of data that the virtual machine is likely to use, e.g., before the virtual machine actually requests the portion of data.

The method can involve generating tags based on applications associated with the virtual machine. The tags can be included in entries in the list. In an embodiment, the method involves receiving information that identifies common entries. In this embodiment, a common entry identifies locations in a storage device that are shared by the virtual machine and another virtual machine.

In an embodiment, the method involves dividing the virtual machine into chunks and generating a fingerprint for each chunk. The fingerprints are included in entries in the list. Thus, portions of the virtual machine that are common between multiple virtual machines can be used as the basis for selecting a computing device on which to implement the virtual machine.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
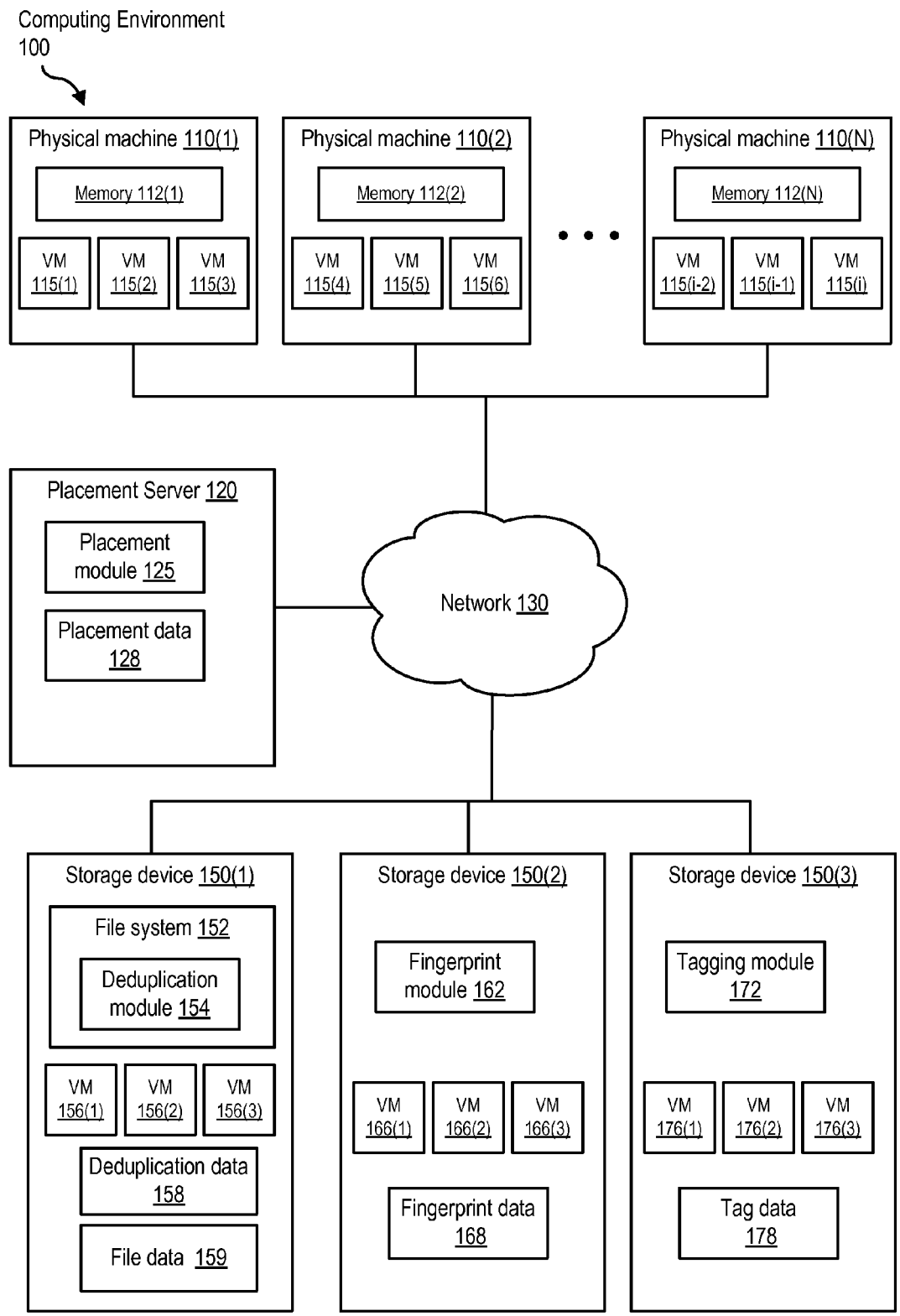
FIG. 1 is a block diagram of a system in which multiple physical machines can host virtual machines, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A virtual machine is a computing entity, such as a software construct, that provides functionality typically associated with a physical computing device. Such functionality includes, for example, the ability to run applications such as word processing, database, and web browsing programs. A virtual machine can execute an operating system, such as Windows XP®, Windows Vista®, Linux, Mac OS X®, and the like. A virtual machine executes on a physical machine, known as a host. Multiple virtual machines can be implemented, or provisioned, on a single physical machine. A given virtual machine is logically isolated from other virtual machines running on a physical machine.

When a new virtual machine is to be provisioned in an environment where multiple physical machines are available, selecting which physical machine to use for the new virtual machine is an important decision. In the case where an existing virtual machine is to be moved from one physical machine to another, e.g., if the physical machine on which the virtual machine is provisioned is being taken offline for maintenance, selecting which physical machine to move the existing virtual machine to is an equally important decision.

The performance of a virtual machine (either a new virtual machine or an existing virtual machine that is being migrated from one physical machine to another physical machine) and associated applications may vary depending on the physical machine selected to host the virtual machine. That is, the virtual machine's performance, e.g., speed, responsiveness, stability, may vary depending on the physical machine the virtual machine is implemented on. Running a virtual machine on a given physical machine can also affect performance of the physical machine and other processes running on the physical machine. The virtual machine may consume the physical machine's resources, resulting in fewer resources being available for other processes being executed by the physical machine, e.g., other virtual machines implemented on the same physical machine. One technique to more efficiently use the physical machine's resources is for the virtual machines implemented on the physical machine to share memory pages that are used by multiple virtual machines. That is, the physical machine's memory can be deduplicated.

In an environment where multiple physical machines are available to host a virtual machine, one way to select which physical machine to host the virtual machine is to compare the available resources, e.g., network transmission bandwidth, memory, processor cycles, of each physical machine and select the physical machine with the most available resources. Another way to select a physical machine from among several available physical machines is round-robin, where the available physical machines take turns hosting virtual machines that are being newly provisioned or migrated from another physical machine. Meeting terms imposed in negotiated service level agreements is sometimes an important consideration in placing virtual machines.

None of the above approaches considers how selecting a particular physical machine is likely to affect the memory consumption and hence the performance of the virtual machine and the physical machine relative to selecting a different physical machine. An approach which does so is described below. This approach considers the impact hosting a virtual machine is likely to have on one of the major performance bottlenecks when hosting multiple virtual machines, namely limited memory resources on a physical machine. The approach described below considers use of a physical machine's memory when selecting which physical machine is to host a virtual machine. In some embodiments, an optimal or at least improved usage of the physical machine's memory can be obtained using this approach.

FIG. 1 is a block diagram of a computing environment 100. As shown, computing environment 100 includes several physical machines 110(1)-110(N). Each physical machine 110 hosts several virtual machines 115(1)-115(i). It is noted that alternative embodiments can implement different numbers of physical machines, different numbers of virtual machines per physical machine, and the same system can include one or more physical machines that each implement a different number of virtual machines than other physical machines within the same environment.

It will be noted that the variable identifiers "N" and "i" are used to more simply designate the final element (e.g., physical machine 110(N)) of a series of related or similar elements (e.g., physical machines). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Physical machines 110 are coupled to a placement server 120 and several storage devices 150(1)-150(3) by network 130. Network 130 can include a WAN (Wide Area Network), such as the Internet, one or more LANs (Local Area Networks), and/or one or more SANs (Storage Area Networks).

Physical machines 110 are computing devices, or portions of computing devices, such as personal computers, laptop computers, servers, personal digital assistants, cell phones, or the like. In some embodiments, such physical machines are included in a cloud computing environment in which physical computing resources, such as memory and processor cycles, are allocated on an as-needed and/or as-contracted basis. The resources of a physical machine 110 are shared by any virtual machines that are implemented on the physical machine. Physical machines 110 each include memory 112. Memory 112 is, in an embodiment, random access memory (RAM). Memory 112 is organized into a number of pages. A page is generally a fixed size portion of memory, for example a 4 kilobyte (Kb) portion of memory.

Virtual machines 115 can be used, e.g., by a cloud vendor, to provide computing resources, e.g., to a user associated with an enterprise. When a user, e.g., an information technology (IT) professional at an enterprise, requests additional resources an administrator, e.g., an IT professional at the cloud vendor, can provision one or more additional virtual machines to satisfy the request for additional resources. In an embodiment, placement module 125 can detect requirements specified by a user in a request for computing resources. Placement module 125 can automatically create or locate a virtual machine in response to the request and cause the virtual machine to be provisioned on one of physical machines 110.

The administrator can also move one or more virtual machines from a first physical machine to an alternate physical machine. For example, an administrator can move (migrate) one or more virtual machines to a different (target) physical machine in response to detecting that a physical machine is failing, has failed, is overloaded, or that additional resources are available on a different physical machine from the physical machine currently hosting the one or more virtual machines. In an embodiment, placement module 125 can automatically detect a condition that indicates a virtual machine should be migrated, such as detecting that a physical machine is failing, has failed, is overloaded, or that additional resources are available on a different physical machine from the physical machine currently hosting the one or more virtual machines. Placement module 125 can automatically migrate one or more virtual machines in response to detecting such a condition.

Placement server 120 is a computing device, or portion of a computing device, such as a personal computer, laptop computer, server, personal digital assistant, cell phone, or the like. Placement server 120 can select a target physical machine to host a new or migrated virtual machine. Placement server 120 includes a placement module 125 and placement data 128.

Placement module 125 can select a target physical machine based upon the likelihood that a new virtual machine (or a virtual machine being migrated from one physical machine to another physical machine) will more effectively utilize memory of the target physical machine, e.g., by virtue of sharing a greater number of memory pages with one or more virtual machines that are or will be hosted by the target physical machine.

Placement module 125 can collect information indicating which physical machine is likely to share the largest number of shared memory pages with a given virtual machine and store the information in placement data 128. Placement module 125 can analyze placement data 128 to select which physical machine is to host a virtual machine. Placement module 125 can collect placement data 128 in various forms from various sources. Placement module 125 can also keep track of what data is in memory for each physical machine. In an embodiment, each physical machine periodically transmits to placement module 125 a list of entries that indicate which pages are stored in the physical machine's memory. Alternatively, the physical machine can transmit the list in response to adding a new page to memory, in response to a new virtual machine being provisioned on the physical machine, and/or in response to a request by placement module placement module 125 for a list of entries. In an embodiment, each entry includes an address, e.g., an address of a page. Alternatively, each entry can include a signature, such as a fingerprint, that uniquely identifies the data stored at a given address. In another embodiment, the entries can each include a tag that identifies a characteristic of one or more virtual machines hosted by the physical machine, such as an operating system or application used by a virtual machine hosted by the physical machine.

In an embodiment in which a virtual machine is running on a physical machine and is being moved to another physical machine, placement module 125 can use memory information from the physical machine the virtual machine is running on to determine which of multiple available physical machines (target physical machines) the virtual machine should be migrated to. That is, placement module 125 can compare a list of entries, where each entry indicates a page used by the virtual machine (as received from the physical machine that is hosting the virtual machine) with a list of entries, where an entry indicates a page stored in memory of a target physical machine, for each of the target physical machines. Placement module 125 can count the number of entries in the list for the virtual machine that are also present in a list of entries for each target physical machine and determine the number of page entries that are located in both places. This number indicates how many pages the virtual machine would share with entities on each target physical machine. In an embodiment, placement module 125 selects the target physical machine with the most common entries to host the virtual machine.

In order to generate a list of pages used by the virtual machine, the physical machine can track which pages the virtual machine requests. This involves trapping a memory call in response to detecting a request to bring a page into memory. For example, a file system running on physical machine 110 can be modified to trap a request for a memory load. Alternatively, a layered file system, e.g., a virtual file system executed by the virtual machine, can trap the memory call. In an embodiment, the physical machine generates a fingerprint for each page the virtual machine requests and keeps a list of the fingerprints. Alternatively, the physical machine can generate fingerprints for a subset of pages requested. For example, the physical machine can generate a fingerprint for one out of four pages. Generating a list for only a subset reduces resources consumed by the physical machine for fingerprinting.

Generating fingerprints for pages in response to detecting that a virtual machine has requested that the pages be loaded is known as dynamic placement, since the virtual machine is actually running and placement will be based on data collected while the virtual machine is running. Dynamic placement is accurate, in that only pages actually used are considered. However, dynamic placement is considered expensive, in that calculating fingerprints while the virtual machine is running consumes the physical machine's resources and can cause delay.

The physical machine can utilize various functions to generate a signature, or fingerprint for a given page. Such functions can include one or more of, for example, a Secure Hash Algorithm (SHA), Message-Digest Algorithm 5 (MD5), a Rabin hash, a Cyclic Redundancy Check (CRC) and/or the like. For instance, a signature may be a hash that is generated by a hash function, such as SHA-1, that processes a particular page or portion of a page and in response computes the hash (e.g., a SIS-level signature).

When a virtual machine is not already running on a physical machine, such as when a new virtual machine is being provisioned, placement server 120 can employ static placement techniques. In static placement, a virtual machine image, e.g., virtual machine 156, that is stored in a storage device, e.g., storage device 150, is analyzed to detect what data the virtual machine is likely to use when the virtual machine is deployed to a physical machine. When the virtual machine is eventually deployed, the virtual machine is likely to request that this data be loaded into the memory of the physical machine on which the virtual machine is deployed. Placement module 125 obtains the results of this analysis so placement module 125 has can determine what data a given virtual machine is likely to need. For example, this analysis can include detecting what operating system and/or applications are associated with the virtual machine. Alternatively, the analysis can involve determining what data forms the virtual machine image, or what data is shared by the virtual machine with one or more other virtual machines.

Static placement can be less accurate than dynamic placement. In dynamic placement, placement module 125 is able to compare pages actually used by a running virtual machine with pages stored in one or more physical machines to determine pages in common and make a placement decision based on this page commonality. In static placement, since the virtual machine is typically not yet running, placement module 125 compares a predicted memory usage for the virtual machine being placed with actual memory usage for the physical machines. However, the prediction may not be completely accurate. That is, the virtual machine may not use the same pages that the virtual machine is predicted to use. For example, the virtual machine disk image may show multiple installed applications, but only some of them may be used at runtime. However, dynamic placement imposes a burden on physical machine resources, by virtue of calculating page signatures, e.g., fingerprints, whenever a virtual machine requests a page load. Static placement does not impose this burden. In an embodiment, placement module 125 can use static placement for virtual machines that are already running.

In an embodiment, placement module 125 receives placement data from a storage device, such as one of storage devices 150, instead of and/or in addition to receiving from the physical machines. Storage devices 150 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

A number of virtual machines is stored on each of storage devices 150. Placement module 125 can obtain information regarding what pages each of these virtual machines is likely to use when running and can select a physical machine to host the virtual machine based on comparing this information with information regarding what pages are already in memory on the physical machines.

Storage device 150(1) implements file system 152, which includes deduplication module 154. File system 152 supports deduplication. Virtual machines 156(1)-156(3) are deduplicated. That is, each virtual machine 156 is formed of a set of data. In certain embodiments, a virtual machine 156 includes identical data as another of virtual machine 156. This is likely in cases where two or more virtual machines 156 include identical applications and/or operating systems. When multiple virtual machines 156 include identical data, storage device 150(1) stores only a single copy of the identical data.

Deduplication data 158 includes information identifying which portions of data that make up virtual machines 156 is shared among the virtual machines, e.g., identical between two or more virtual machines 156. In an embodiment, deduplication data 158 includes a list of memory pages. The list can include addresses, such as extents, or fingerprints, and thus can be used as placement data by placement module 125. Placement module 125 can use deduplication data 158 to select a physical machine to host one of virtual machines 156. Placement module 125 can use deduplication data 158 to determine a number of pages shared between each the virtual machines. Placement module 125 can compare the number of pages shared between each virtual machine and select which physical machines the virtual machines should be placed on based on the results of the comparison.

Consider an example in which an instance of virtual machine 156(2) is deployed on a first physical machine 110 and an instance of virtual machine 156(3) is deployed on a second physical machine 110. If virtual machine 156(1) shares a relatively small number of pages with virtual machine 156(2), but virtual machine 156(1) shares a larger number of pages with virtual machine 156(3), placement module 125 will attempt to place virtual machine 156(1) on the same physical machine 110 that hosts virtual machine 156(3) rather than placing virtual machine 156(1) on the same physical machine 110 that hosts virtual machine 156(2). That is, placement module 125 determines the number of pages shared between a virtual machine and virtual machines on a first physical machine, then determines the number of pages shared between the virtual machine and virtual machines on a second physical machine, compares the numbers, and places the virtual machine on the physical machine which has the larger number of shared pages. While FIG. 1 shows three virtual machines and three potential target physical machines on which the three virtual machines can be placed, or deployed, this is merely an example embodiment, and computing environment 100 can include, and placement module 125 can make placement decisions, for more or fewer numbers of physical machines and virtual machines.

Storage device 150(2) includes a fingerprint module 162. Fingerprint module 162 can calculate fingerprints for virtual machines 166(1)-166(3) and store the fingerprints in fingerprint data 168. Calculating fingerprints for a virtual machine involves dividing the virtual machine image and any data related to the virtual machine into chunks, and calculating a fingerprint for each chunk. A chunk is a fixed or variable length portion of data. Fingerprint module 162 can utilize various functions to generate a signature, or fingerprint for each chunk. Such functions can include one or more of, for example, a Secure Hash Algorithm (SHA), Message-Digest Algorithm 5 (MD5), a Rabin hash, a Cyclic Redundancy Check (CRC) and/or the like. For instance, a signature may be a hash that is generated by a hash function, such as SHA-1, that processes a particular chunk and in response computes the hash (e.g., a SIS-level signature).

Placement module 125 receives information from storage device 150(2) regarding what fingerprints are stored in fingerprint data 168. Storage device 150(2) can transmit a list of fingerprints from fingerprint data 168 to placement module 125 periodically, in response to adding a new fingerprint (e.g., if a new virtual machine is stored in storage device 150(2)), and/or in response to a request by placement module 125.

Such a request can specify one or more virtual machines for which fingerprint data should be transmitted to placement module 125. In an embodiment, storage device 150(2) can transmit only new fingerprints, e.g., fingerprints that fingerprint module 162 has generated since a previous transmission of fingerprints, in response to detecting that fingerprint module 162 has generated new fingerprints or in response to a request for fingerprints from placement module 125. Alternatively, storage device 150(2) can transmit all fingerprints in fingerprint data 168 in response to detecting that fingerprint module 162 has generated new fingerprints or in response to a request for fingerprints from placement module 125.

Storage device 150(3) includes a tagging module 172. Tagging module 172 can analyze virtual machines 176(1)-176(3) and store information about the virtual machines in tag data 178. Analyzing the virtual machines involves determining what applications are associated with each virtual machine and assigning a tag to the virtual machine for each application or type of application that the virtual machine includes. Tagging module 125 can detect the characteristics of a given virtual machine by examining metadata associated with the virtual machine that specifies the characteristics and/or parsing the virtual machine image data itself and detecting various data signatures associated with each characteristic. For example, if a virtual machine includes a Windows operating system, tagging module detects this and assigns a tag to the virtual machine that indicates that the virtual machine includes Windows. The virtual machine can also include an Oracle database application, and another virtual machine could include a Linux operating system. Tagging module 172 assigns tags for each of these features to the virtual machines and stores the tags in tag data 178.

Placement module 125 receives information from storage device 150(3) regarding what tags are stored in tag data 168. Storage device 150(3) can transmit a list of tags periodically, in response to adding a new tag (e.g., if a new virtual machine is stored in storage device 150(3)), or in response to a request by placement module 125. Placement module 125 can compare the tags from tag data 168 with tags in placement data 128. The tags in placement data 128 can indicate what data is stored in memory of one or more physical machines, e.g., by indicating tags associated with the one or more physical machines. Placement module 125 can generate a list of tags on a physical machine by detecting which tags are associated with each virtual machine in response to the virtual machine being deployed to the physical machine. Alternatively, a physical machine can include a tagging module (not shown) that generates tags for virtual machines deployed on the physical machine and transmits the tag information to placement module 125.

Based on the results of comparing tags associated with a virtual machine with tags associated with each of one or more available target physical machines, placement module 125 can determine which physical machine has the greatest number of common tags and can select that physical machine to act as host to one or more of the of virtual machines 166. In an embodiment, storage device 150(3) can transmit only new tags, e.g., tags that tagging module 172 has generated since a previous transmission of tags, in response to detecting that tagging module 172 has generated new tags or in response to a request for tags from placement module 125. Alternatively, storage device 150(2) can transmit all tags in tag data 178 in response to detecting that tagging module 172 has generated new tags or in response to a request for tags from placement module 125.

In an embodiment, placement module 125 makes placement decisions based upon a combination of the various types of placement information, e.g., fingerprints and tags. For example, placement module 125 can employ a hierarchical decision tree to determine which physical machine will host a given virtual machine. Placement module 125 can make a first placement decision based on, for example, fingerprint information. Placement module 125 can select a subset of physical machines to consider as potential hosts for a given virtual machine based on criteria related to fingerprints. For example, placement module 125 can select all physical machines with greater than a specified number of common fingerprints. Placement module 125 can then use a second criterion, e.g., tags, to make another decision regarding which physical machines to consider as potential hosts for the given virtual machine from among the subset that satisfies the first (e.g., fingerprint threshold) criteria.

In another embodiment, page commonality, either predicted or actual, is one of a plurality of factors used to select a physical machine. In such an embodiment, placement module 125 bases a placement decision on a combination of factors. For example, placement module 125 can calculate a placement score for each physical machine using a weighted combination of multiple factors, such as page commonality (e.g., as identified based on fingerprints and/or tags), available resources, quality of service, number of virtual machines running on a given physical machine, and the like. The placement score can indicate an amount of likely page commonality between a given virtual machine and the RAM for a given target physical machine. Placement module 125 can select the physical machine with the highest placement score of physical machines for which placement module 125 calculated a placement score to act as host for the given virtual machine.

While deduplication module 154, fingerprint module 162, and tagging module 172 are each shown on a separate and single storage device, it is understood that each of storage devices 150 can include one or more (or none) of these. Additionally, physical machines 110 can also include one or more of a deduplication module, fingerprint module, and/or tagging module.

Figure 2:
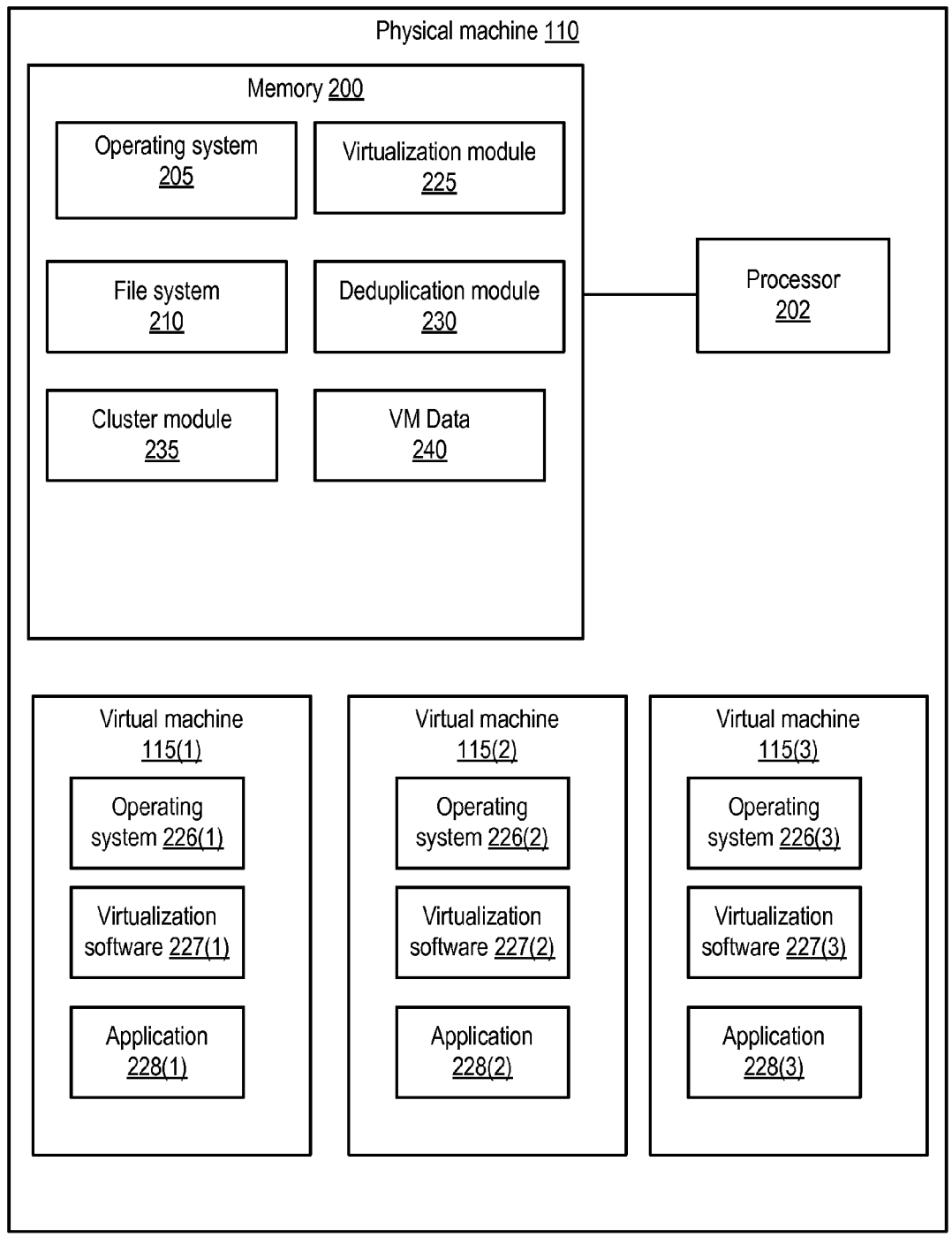
FIG. 2 is a block diagram of a physical machine that can host multiple virtual machines, according to one embodiment of the present invention.

FIG. 2 is a block diagram of a physical machine 110. Physical machine 110 includes a memory 200 and a processor 202. Physical machine 110 also includes several virtual machines 115(1)-115(3). While three virtual machines are shown, physical machine 110 can include more or fewer virtual machines.

Memory 200 includes an operating system 205. Operating system 205 controls the hardware of physical machine 110 and provides various services to applications and virtual machines executing on client physical machine 110. For example, when a virtual machine 115 requests a page be brought into memory 200, the operating system can relay the request to file system 210, which can request that the page be read, e.g., from file data 159 in storage device 150(1). File system 210 can receive the page and write the page to memory 200, e.g., to virtual machine data 240. File system 210 can organize data, such as file data 159 in storage 150(1), into files and directories. File system 210 can maintain a listing of the physical locations of files and data in storage 150(1).

Memory 200 includes a deduplication module 230. Deduplication module 230 can perform deduplication operations related to memory 200, including virtual machine data 240. When a specified unit of data, e.g., a page, is to be loaded into memory 200, deduplication module 230 determines whether a unit of data containing identical data already exists in memory 200, e.g., the data may have been requested by another virtual machine hosted on physical machine 110. If the unit of data is already present, rather than store the data, thus resulting in multiple copies of the same data stored in memory, deduplication module 230 creates a pointer to the existing copy of the unit of data, increases a reference count associated with the existing copy of the unit of data, and prevents the specified unit of data from being stored again in memory 200. The pointer can redirect a subsequent request to access the unit of data (e.g., by the virtual machine that requested the unit of data be loaded) and incrementing a reference counter that indicates how many entities (e.g., virtual machines) have an interest in the data. The deduplication operation is transparent to the virtual machine that requested the unit of data be loaded and the virtual machine can use the unit data that is already present in memory as though the load request were fulfilled.

In an embodiment, deduplication module 230 is notified by file system 210 of the page request. To determine whether the page already exists in memory, deduplication module 230 calculates a signature, e.g., fingerprint, for the page and compares the fingerprint with a list of fingerprints stored in virtual machine data 240. If the fingerprint exists in the list, the page is redundant, and deduplication module 230 notifies file system 210 to cancel the load. If the fingerprint is not found, the page is not already stored in virtual machine data 240 and deduplication module 230 adds the fingerprint to the list of fingerprints and allows the load to proceed. Virtual machine data 240 includes data used by virtual machines 115, as well as a list of fingerprints for the data.

Memory 200 includes a virtualization module 225. Virtualization module 225 performs operations related to creation and management of virtual machines and resources for virtual machines. Virtualization module 225 is illustrated as a standalone module but can also be included in operating system 205. Virtualization module 225 provides physical machine 110 the ability to concurrently support one or more virtual machines, such as virtual machines 115. Virtualization module 225 provides this ability by coordinating the distribution of computer resources (e.g., processing power, memory, etc.) to the virtual machines so that the virtual machines operate similarly to physical computers. Virtualization module 225 can be designed to support virtual machines by coordinating processor resources to support the execution of instructions on behalf of the virtual machines, and performing memory management to help ensure that the virtual machines effectively share the host computer's system memory.

Memory 200 includes a cluster module 235. In an embodiment, it is desirable to make a placement decision for multiple virtual machines at once. In this embodiment, a placement server, e.g., placement server 120 of FIG. 1, can form clusters of similar virtual machines, where similarity is defined by the number of duplicate pages shared by the virtual machines. The duplicate pages can be due to various factors, e.g., the virtual machines running a common operating system or a common application or processing the same data. This data may be data that is included in the virtual machines themselves, or stored outside the virtual machines, e.g., in file data 159. The placement server can then select a physical machine and place a cluster of virtual machines on the selected physical machine. The sizes of a cluster can depend on various factors, such as available resources on each physical machine, resource requirements of the virtual machines, and the like. Various algorithms can be used for clustering. For example, the placement server can create clusters using a K-means algorithm, hierarchical clustering, or a probabilistic clustering algorithm. The distance metric generally used for clustering can be considered as inversely proportional to number of common memory pages. That is, more common pages means lesser distance between two virtual machines, and hence more chance of the virtual machines falling into same cluster.

Physical machine 110 includes virtual machines 115(1)-115(3). In general terms, virtual machines 115 are software constructs that act as physical computer systems. For instance, virtual machines 1115 can include and execute applications, provide services, and process commands. A virtual machine has its own operating system, such as Microsoft Windows® or Unix, and can interface with virtualization software on a host, such as is provided virtualization module 225 on physical machine 110.

Figure 3A:
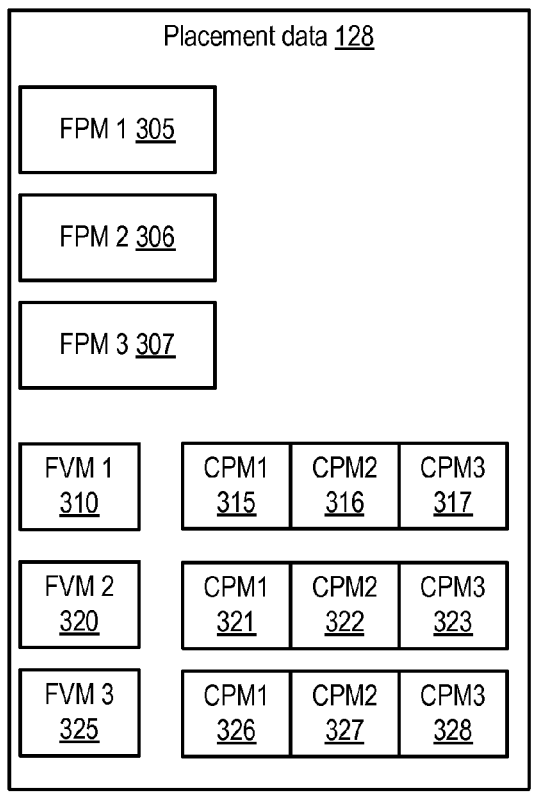
FIG. 3A illustrates placement data that can be used to select one of a plurality of physical machines to host a virtual machine, according to one embodiment of the present invention.

FIG. 3A illustrates placement data 128. As illustrated, placement data 128 includes FPM 1 305, FPM 2 306, and FPM 3 307. In an embodiment, FPM 1 305 is a list of signatures, e.g., fingerprints, of pages that have been loaded into memory of a first physical machine, e.g., memory 112(1) of physical machine 110(1) of FIG. 1. That is, FPM 1, FPM 2, and FPM 3 each indicate fingerprints associated with physical machine 1, physical machine 2, and physical machine 3, respectively. In response to a virtual machine requesting a page, a deduplication module, e.g., deduplication module 230 of FIG. 2, generates a fingerprint for the page and compares the fingerprint to a list of fingerprints, where the list includes a fingerprint for each page stored in memory 200. If the fingerprint is not present, the deduplication module adds the fingerprint to the list, and the physical machine adds the page to memory.

The deduplication module sends the list of fingerprints to a placement server, e.g., placement server 120 of FIG. 1, and the placement server updates FPM 1 305 by adding any new fingerprints to FPM 1 305. Thus, FPM 1 305 includes a list of fingerprints that includes a fingerprint for each page stored in a first physical machine's memory. Likewise, FPM 2 306 includes a list of fingerprints that includes a fingerprint for each page stored in a second physical machine's memory and FPM 3 307 includes a list of fingerprints that includes a fingerprint for each page stored in a third physical machine's memory.

FVM 1 310 includes a list of fingerprints for a first virtual machine. In an embodiment, a placement server receives fingerprints from a physical machine hosting a virtual machine. The physical machine sends a fingerprint of each page associated with the virtual machine, such as pages the virtual machine has requested access to. In another embodiment, the placement server receives the fingerprints from a storage device that stores the virtual machine. In this embodiment, a deduplication module on the storage device can divide the virtual machine into chunks and calculate fingerprints for the chunks of the virtual machine as well as for any associated data. The deduplication module can transmit the fingerprints to the placement server, which stores them in placement data 128, e.g., in FVM 1 310.

Likewise, FVM 2 320 includes a list of fingerprints associated with a second virtual machine and FVM 3 330 includes a list of fingerprints associated with a third virtual machine. While placement data 128 is shown as including lists of fingerprints for three physical machines and three virtual machines, more or fewer virtual machines and physical machines are possible.

Placement data 128 also includes a number of counters CPM1 315, CPM2 316, CPM3 317, CPM1 321, CPM2 322, CPM3 323, CPM1 326, CPM2 326, and CPM3 328. These counters indicate how many fingerprints a given virtual machine has in common with a given physical machine. In the illustrated embodiment, CPM1 315, CPM2 316, and CPM3 317 are counters indicating how many fingerprints a first virtual machine (e.g., virtual machine 166(1) of FIG. 1) has in common with each of three respective physical machines (e.g., physical machines 110 of FIG. 1). In the illustrated embodiment, CPM1 321, CPM2 322, and CPM3 323 are counters indicating how many fingerprints a second virtual machine (e.g., virtual machine 166(2) of FIG. 1) has in common with each of three respective physical machines (e.g., physical machines 110 of FIG. 1), and CPM1 326, CPM2 327, and CPM3 328 are counters indicating how many fingerprints a third virtual machine (e.g., virtual machine 166(3) of FIG. 1) has in common with each of three respective physical machines (e.g., physical machines 110 of FIG. 1).

A placement module can compare the fingerprints in FVM 1 310 with the fingerprints in FPM 1 305 to determine how many fingerprints in FVM 1 310 are also in FPM 1 305. Each time the placement module finds a fingerprint that is in both places, the placement module can increment the counter CPM1 315. Similarly, the placement module can compare the fingerprints in FVM 1 310 with FPM 2 306 to determine how many fingerprints in FVM 1 310 are also in FPM 2 306. Each time the placement module finds a fingerprint that is in both places, the placement module can increment the counter CPM2 316. The placement module can determine which of the physical machines has the highest number of fingerprints in common with a given virtual machine. The physical machine with the highest number of common entries will share the most memory pages with the given virtual machine. The placement module can specify that the virtual machine be provisioned on, or migrated to, the physical machine with the highest number of common fingerprints, or the physical machine associated with the highest counter.

Figure 3B:
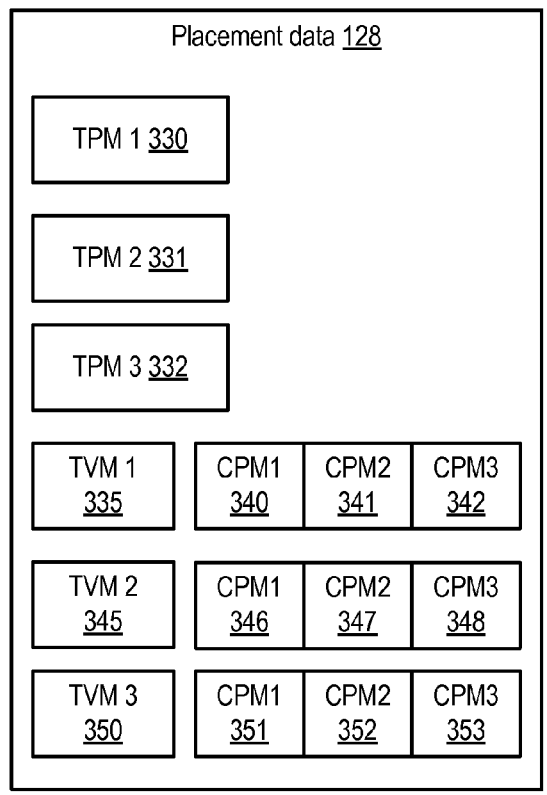
FIG. 3B illustrates placement data that can be used to select one of a plurality of physical machines to host a virtual machine, according to one embodiment of the present invention.

FIG. 3B illustrates placement data that can be used to select one of a plurality of physical machines, e.g., physical machines 110 of FIG. 1, to host a virtual machine, e.g., virtual machine 176(1) of FIG. 1, according to one embodiment of the present invention. As illustrated, placement data 128 includes TPM 1 330, TPM 2 331, and TPM 3 332. TPM 1 330 includes a list of tags associated with virtual machines running on a first physical machine. That is, TPM 1, TPM 2, and TPM 3 each indicate tags associated with physical machine 1, physical machine 2, and physical machine 3, respectively.

In an embodiment, a virtual machine running on the physical machine may be running a Windows operating system and an Oracle database application. The physical machine can generate a tag that identifies each of these applications and send the tags to a placement server, e.g., placement server 120 of FIG. 1, which stores the tags in TPM 1 330. Alternatively, the physical machine may receive the tags when the virtual machine is deployed to the physical machine. Each time a virtual machine is added or removed from the physical machine, the physical machine can notify the placement server, either by sending additional tags associated with a new virtual machine or by requesting the placement server remove one or more tags from TPM 1 330, e.g., in response to a virtual machine being removed from the physical machine. The physical machine may send the updates periodically, in response to changes, or in response to a request from the placement server. Likewise, TPM 2 331 includes a list of tags that includes tags associated with the virtual machines running on a second physical machine and TPM 3 332 includes a list tags associated with the virtual machines running on a third physical machine.

As illustrated in FIG. 3B, placement data 128 also includes TVM 1 335, which includes a list of tags associated with a first virtual machine. A tagging module, such as tagging module 172 of FIG. 1, generates tags for a virtual machine. To do so, the tagging module analyzes the virtual machine to detect characteristics of the virtual machine, such as what applications the virtual machine includes. The tagging module then creates a tag for each characteristic, or attribute. The tagging module transmits the tags to the placement server, which stores the tags in placement data 128. The tagging module can transmit the tags to the placement server in response to modifications to one or more virtual machines, such as creation of a new virtual machine, or reconfiguration of a virtual machine. Alternatively, the tagging module can transmit tagging information in response to a request from the placement server, where the request specifies that tagging information associated with one or more virtual machines should be transmitted to the placement server.

Likewise, TVM 2 345 includes a list of tags associated with a second virtual machine and TVM 3 350 includes a list of tags associated with a third virtual machine. While placement data is shown as including lists of fingerprints for three physical machines and three virtual machines, more or fewer are possible.

Placement data 128 also includes a number of counters CPM1 340, CPM2 341, CPM3 341, CPM1 346, CPM2 347, CPM3 348, CPM1 351, CPM2 352, and CPM3 353. These counters indicate how many tags a given virtual machine has in common with a given physical machine. In the illustrated embodiment, CPM1 340, CPM2 341, and CPM3 342 are counters indicating how many tags a first virtual machine (e.g., virtual machine 176(1) of FIG. 1) has in common with each of three respective physical machines (e.g., physical machines 110 of FIG. 1). In the illustrated embodiment, CPM1 346, CPM2 347, and CPM3 348 are counters indicating how many tags a second virtual machine (e.g., virtual machine 176(2) of FIG. 1) has in common with each of three respective physical machines (e.g., physical machines 110 of FIG. 1), and CPM1 351, CPM2 352, and CPM3 353 are counters indicating how many tags a third virtual machine (e.g., virtual machine 176(3) of FIG. 1) has in common with each of three respective physical machines (e.g., physical machines 110 of FIG. 1).

In an embodiment, a placement module can compare the tags in TVM 1 335 with the tags in TPM 1 305 to determine how many tags in TVM 1 335 are also in TPM 1 330. Each time the placement module finds a tag that is in both lists, the placement module can increment the counter CPM1 340. Similarly, the placement module can compare the tags in TVM 1 335 with TPM 2 331 to determine how many tags in TVM 1 335 are also in TPM 2 331. Each time the placement module finds a tag that is in both lists, the placement module can increment the counter CPM2 316. The placement module can perform such comparisons between each virtual machine and each physical machine to determine which of the physical machines has the highest number of common entries with a given virtual machine. The physical machine with the highest number of common entries will share the most memory pages with the given virtual machine. The placement module can specify that the virtual machine be provisioned on, or migrated to, the physical machine with the highest number of common entries, or the physical machine associated with the highest counter.

Figure 4:
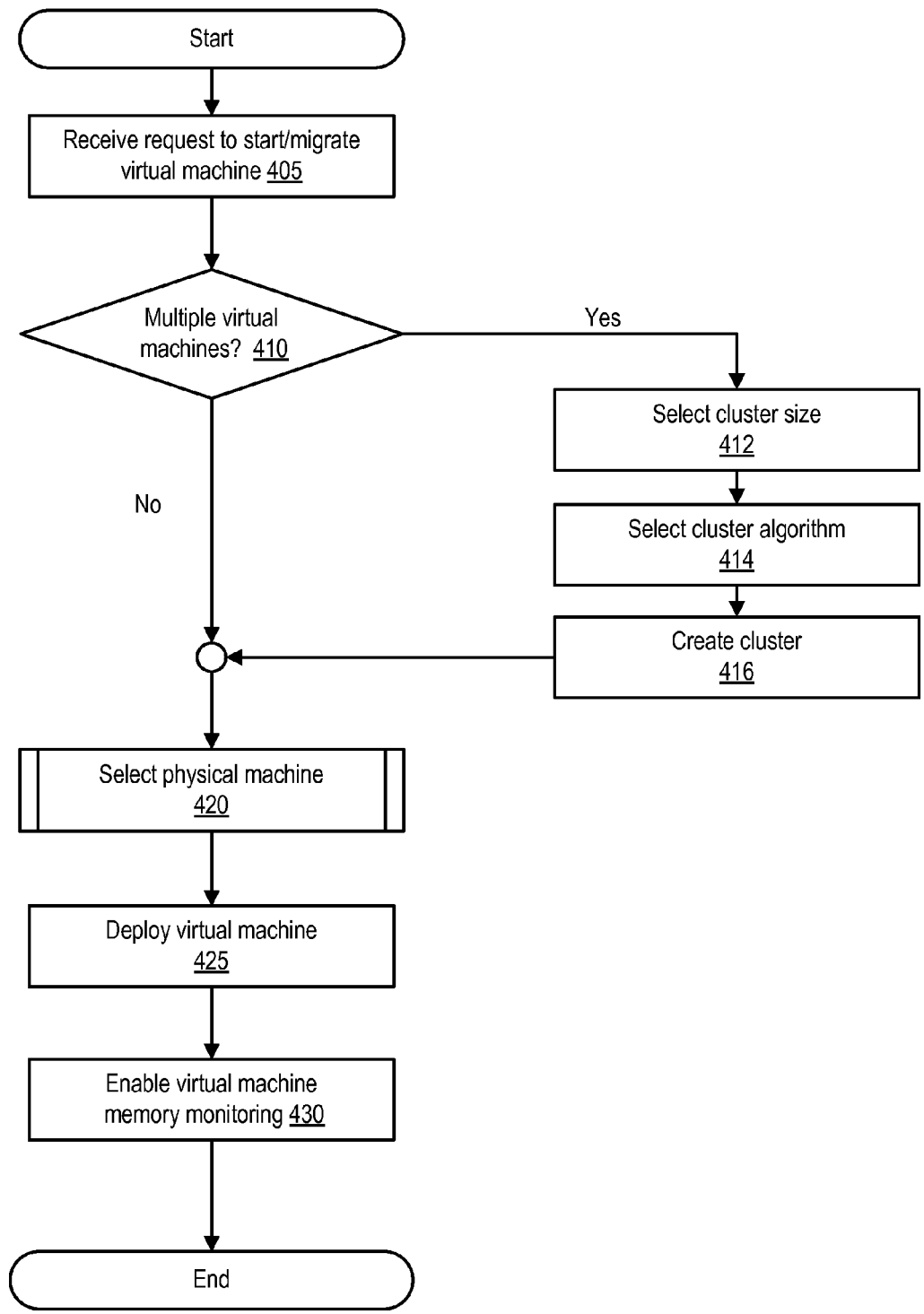
FIG. 4 is a flowchart of a method of placing a virtual machine on a physical machine, according to one embodiment of the present invention.

FIG. 4 is a flowchart of a method of placing a virtual machine on a physical machine. This method can be performed by a placement server that implements a placement module, e.g., placement module placement module 125 on placement server 120 of FIG. 1.

The method begins at 405, where the placement module receives a request to place a virtual machine on a physical machine. The request can specify that a virtual machine is to be provisioned and loaded onto a physical machine. For example, the virtual machine can be copied from a storage device, such as storage device 150 of FIG. 1, and written to a physical machine, such as physical machine 110 of FIG. 1. Alternatively, the request can specify that a virtual machine that is already running on a physical machine be migrated to another physical machine. The request can be generated by an administrator of a computing environment, such as computing environment 100 of FIG. 1. Alternatively, the request can be generated by a physical machine, for example in response to the physical machine detecting that the physical machine is overloaded or is being shut down, e.g., in response to detecting a failure. In an embodiment, the request is generated by the placement server, which can monitor the computing environment and detect when a virtual machine should be migrated, e.g., in response to detecting that migrating the virtual machine may improve performance by increasing the number of shared memory pages between a virtual machine and a particular physical machine, relative to the number of shared memory pages between the virtual machine and a physical machine on which the virtual machine is currently running or on which the virtual machine is to be provisioned.

At 410, the placement module detects whether the request specifies that multiple virtual machines are to be placed. If so, the placement module groups the virtual machines. Grouping multiple virtual machines involves forming a cluster of virtual machines. In an embodiment, this involves selecting a cluster size at 412 and cluster algorithm at 414. At 416, the placement module creates the cluster using the selected size and algorithm.

When only a single virtual machine is to be placed, or after creating cluster of virtual machines, the placement module selects a physical machine to host the virtual machine (or cluster of virtual machines at 420. The process of selecting a physical machine is described in more detail with regard to FIGS. 5-9.

Figure 5:
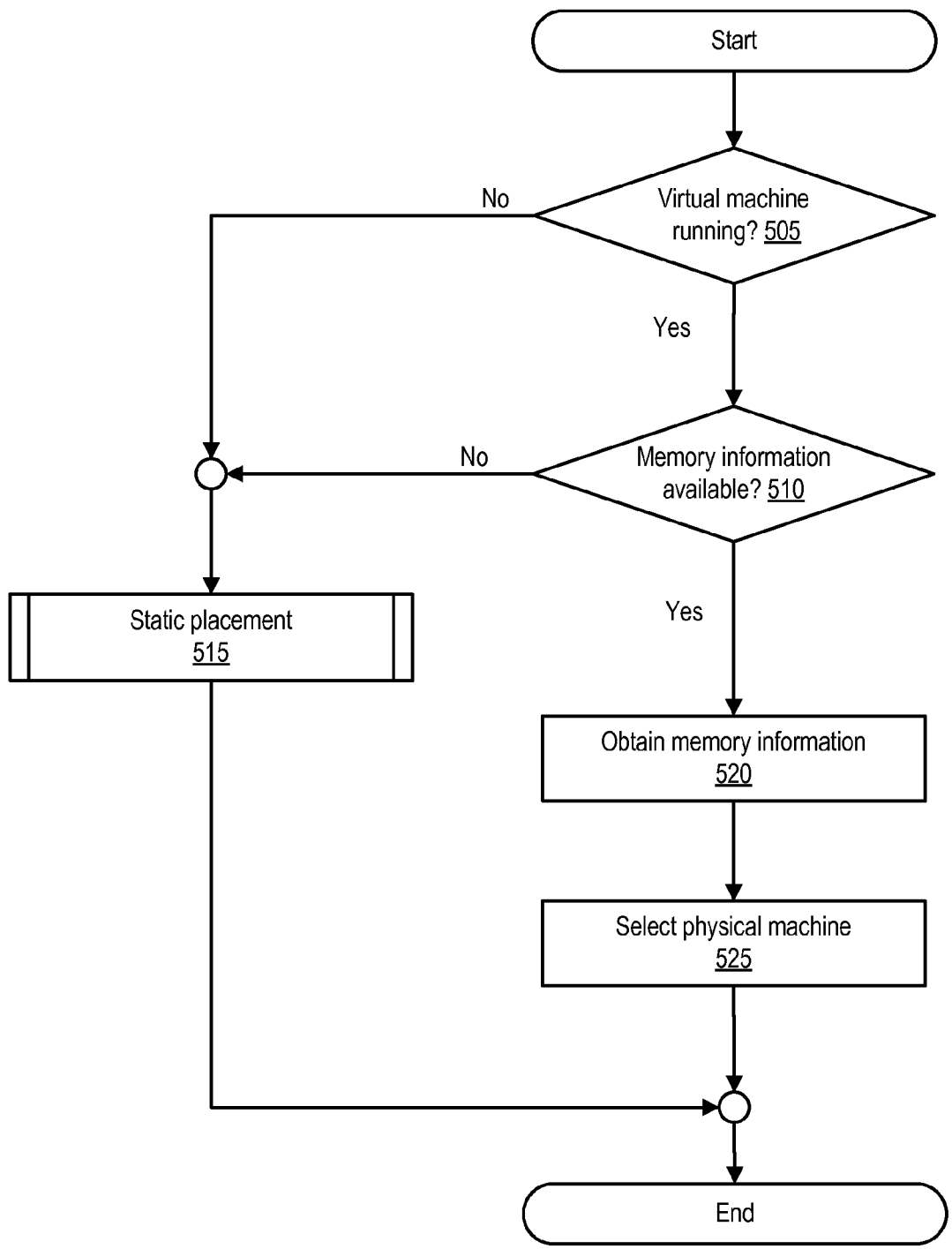
FIG. 5 is a flowchart illustrating additional details of a method of placing a virtual machine on a physical machine, according to one embodiment of the present invention.

FIG. 5 is a flowchart illustrating additional details of a method of placing a virtual machine on a physical machine. FIG. 5 shows a process that the placement module, e.g., placement module 125 of FIG. 1, can use to determine whether to use static placement or dynamic placement.

At 505, the placement module detects whether a virtual machine is running. If not, the placement module uses static placement at 515, described more fully with regard to FIGS. 6 through 9. For example, if the placement module is requested to determine which physical machine to select to host a new virtual machine, e.g., a virtual machine stored in a storage device such as storage device 150 of FIG. 1, the placement module can use static placement techniques to select a physical machine. On the other hand, if the placement module detects that a virtual machine is running, for example if the placement module has received a request to migrate the virtual machine from one physical machine to another physical machine, then the placement module detects whether memory information is available at 510. That is, the placement module detects whether fingerprints have been generated for pages that the virtual machine has requested while the virtual machine was running. If not, the placement module uses static placement techniques at 515, described more fully with regard to FIGS. 6 through 9.

If the virtual machine is running, and there is memory information available, the placement module obtains the memory information at 520. The placement module can receive the memory information from a physical machine on which the virtual machine is running. The placement module can request that the physical machine send the information or the physical machine can send the memory information periodically, or in response to updating the memory information.

At 525, the placement module selects a target physical machine to which the virtual machine will be migrated. In an embodiment, selecting the target physical machine involves the placement module comparing the received memory information with information for each of multiple candidate physical machines that are available to host the virtual machine. The placement module can select a target physical machine based on detecting which physical machine among the candidate physical machines has the largest number of common memory pages. To determine which candidate physical machine has the largest number of common entries, the placement module compares the memory information, which includes a list of entries, where each entry is a fingerprint for a page requested by the virtual machine with information for each candidate physical machine. The placement module uses fingerprint information, e.g., as stored in placement data 128 of FIG. 1, for each of the candidate physical machines, where the fingerprint data includes a list of entries for each physical machine that includes a fingerprint (entry) for each page each physical machine's memory. Based on determining which physical machine's list has the highest number of entries in common with the memory information for the virtual machine, the placement module selects a target physical machine.

Figure 6:
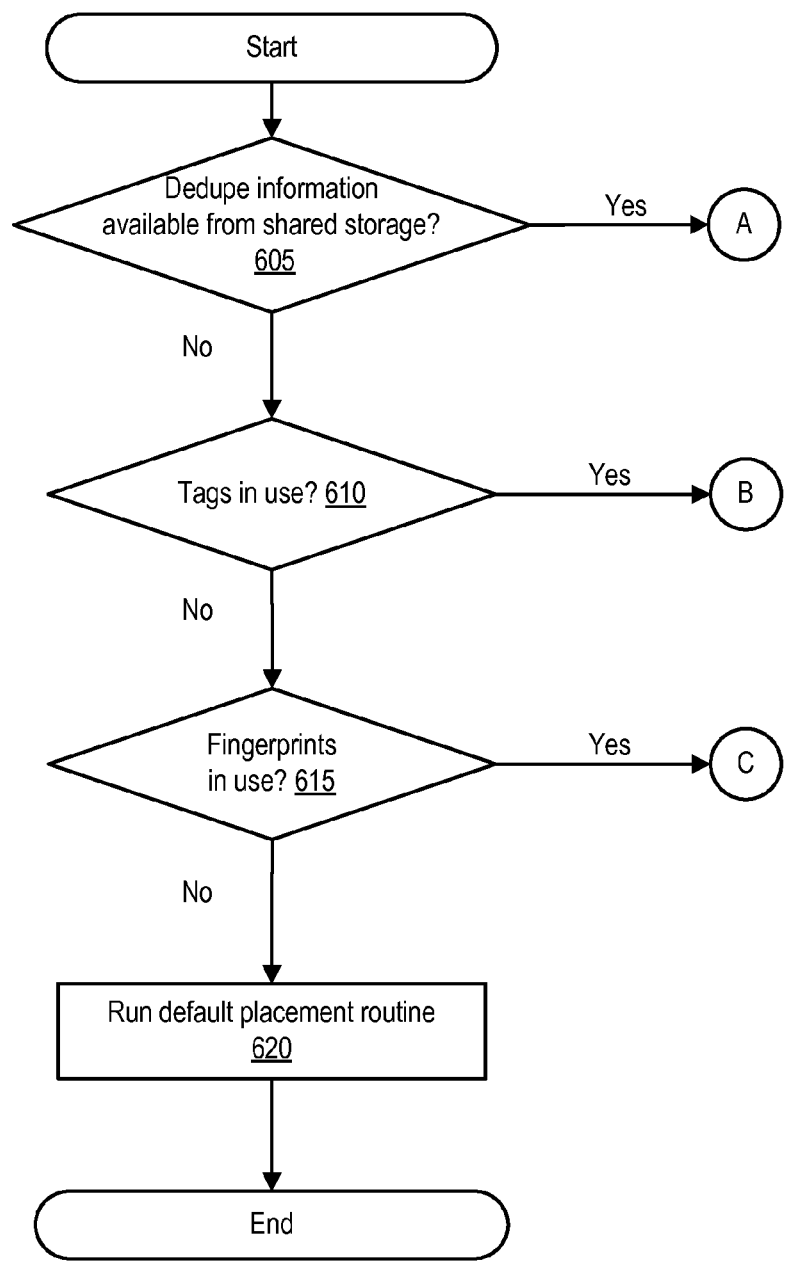
FIG. 6 is a flowchart illustrating a determination of a method to use in placing a virtual machine, according to one embodiment of the present invention.

FIG. 6 is a flowchart illustrating additional details of a method of placing a virtual machine on a physical machine. FIG. 6 illustrates a process the placement module can use to select a criterion for a placement routine. In an embodiment, a user can specify which criterion is to be used, for example by using a user interface to select a placement method from among several available placement methods. In another embodiment, a placement module can automatically select which placement criterion to use.

Figure 7:
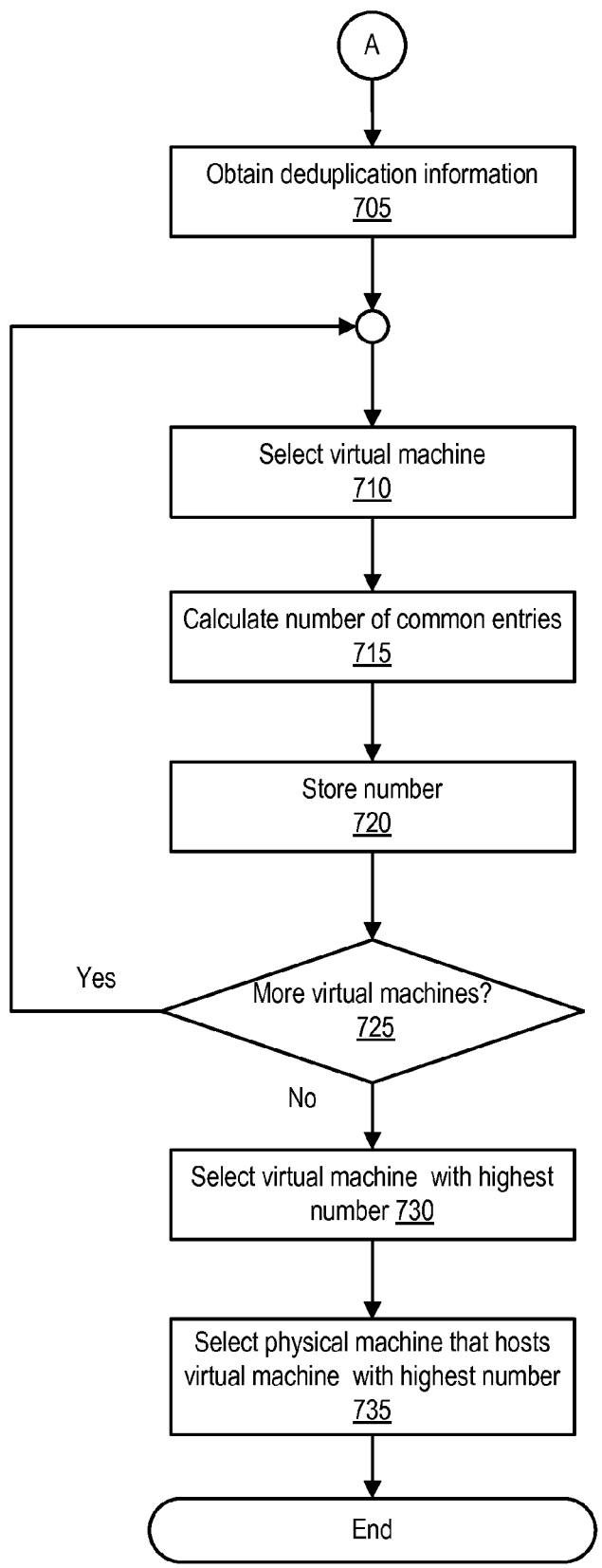
FIG. 7 is a flowchart illustrating additional details of a method of placing a virtual machine on a physical machine using deduplication information, according to one embodiment of the present invention.

If the placement module detects at 605 that deduplication data is available, e.g., from a shared storage device that supports deduplication and on which multiple virtual machines are stored, the method proceeds to A, described in greater detail with regard to FIG. 7. If instead the placement module detects at 610 that tag information is available, e.g., from a storage device and/or a physical machine that have generated tags for one or more virtual machines, the method proceeds to B, described in greater detail with regard to FIG. 8. If instead the placement module detects at 615 that fingerprint data is available, e.g., from a storage device that has generated fingerprints for one or more virtual machines and/or related data, the method proceeds to C, described in greater detail with regard to FIG. 9.

If placement data is not available from any of the above sources, the process proceeds to 620, where the placement module runs a default placement routine. The default placement routine can involve selecting a physical machine to host a virtual machine based on factors other than common memory pages between the virtual machine and virtual machines on a physical machine. For example, the placement module can select a physical machine based on available resources of each physical machine, using a round round-robin selection method, and/or in accordance with one or more service level agreements.

FIG. 7 is a flowchart illustrating additional details of a method of placing a virtual machine on a physical machine. In the illustrated embodiment, the placement module has detected that deduplication information is available, e.g., from a shared storage device where the virtual machine image is stored, for a virtual machine that is to be placed on a physical machine. At 705, the placement module obtains the deduplication information. The placement module can send a request, e.g., to the storage shared device, requesting the deduplication information and then wait for a reply. Alternatively, the shared storage device can automatically send the information to the placement module. The deduplication information identifies portions of data associated with a virtual machine that are also associated with one or more other virtual machines. Typically, the virtual machines are stored in the same storage device. The portions can include portions of the virtual machine images for the virtual machines or other related data. The deduplication information also identifies which virtual machines share the portions of data.

In response to receiving the information, the placement module selects a virtual machine at 710. In an embodiment, the selected virtual machine is a virtual machine that is identified by the deduplication data and stored in the same storage device that the virtual machine that is being placed is stored. The placement module can select the first virtual machine identified by the deduplication data and proceed linearly through the virtual machines.

At 715, the placement module uses the deduplication information to calculate a number of shared portions of data between the virtual machine that is to be placed and the selected virtual machine. For each shared portion of data, the placement module can detect whether the selected virtual machine shares the portion of data. In an embodiment, the placement module can traverse a list of pointers associated with the selected virtual machine and detect whether a pointer in the list identifies a particular shared portion of data. If the deduplication information includes a pointer for the selected virtual machine to a particular shared portion of data, then the selected virtual machine shares the portion of data with the virtual machine that is being placed and the placement module can increment a counter associated with the selected virtual machine. The placement module can proceed through all shared portions, as identified by the deduplication information and calculate the total number of shared portions of data between the virtual machine being placed and the selected virtual machine. The placement module stores the number at 720.

In another embodiment, the placement module can detect, using the deduplication information how many virtual machines share a particular portion of data. The placement module can identify which virtual machines share the portion of data based upon determining the values of pointers associated with the portion of data. For example, if a reference counter in the deduplication data indicates that three virtual machines share a given portion of data. The placement module can traverse a list of pointers associated with each virtual machine to locate three pointers that specify an address associated with the portion of data. The placement module can identify which virtual machine is associated with each pointer that identifies the portion of data and increment a counter for that virtual machine. If the selected virtual machine is associated with one of the three pointers, the placement module updates a counter for the selected virtual machine. In this way, the placement module can determine a number of pointers for each virtual machine that point to portions of data also shared by the virtual machine that is being placed.

At 725, the placement module detects whether there are additional virtual machines stored in the storage device that share portions of data with the virtual machine being placed. The placement module detects whether the deduplication information includes information for any other virtual machines. If so, the process returns to 710, where the placement module selects another virtual machine.

If not, the placement module compares the numbers of shared entries between the virtual machine being placed and each other virtual machine identified by the deduplication information as sharing at least one portion of data with the virtual machine being placed and selects the virtual machine with the highest number of shared entries at 730. At 735, the placement module can identify which physical machine hosts an instance of the virtual machine with the highest number and select that physical machine as the host where the virtual machine will be placed.

Figure 8:
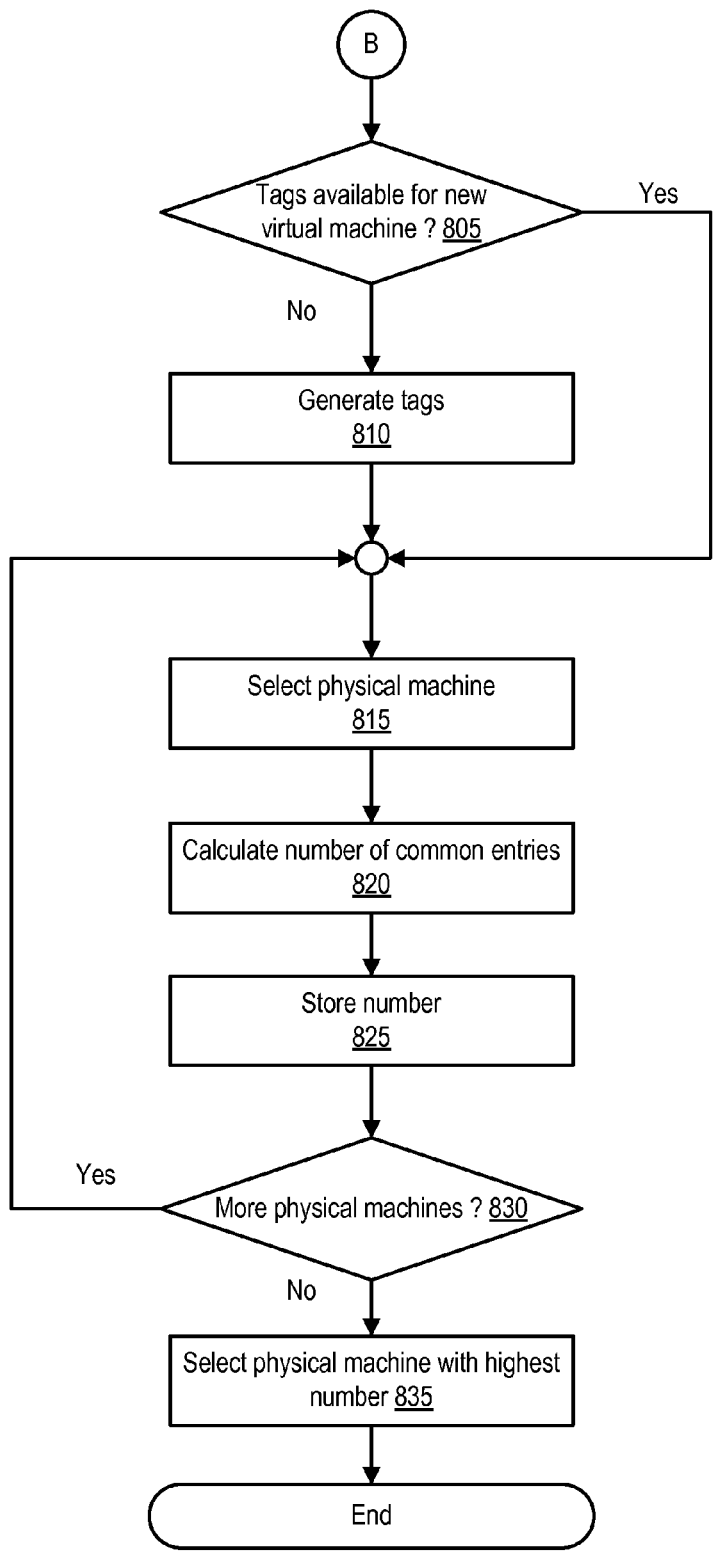
FIG. 8 is a flowchart illustrating additional details of a method of placing a virtual machine on a physical machine using tag information, according to one embodiment of the present invention.

FIG. 8 is a flowchart illustrating additional details of a method of placing a virtual machine on a physical machine. In response to detecting that tags are available for one or more virtual machines running on one or more physical machines, the placement module detects, at 805, whether tags are available for a virtual machine that is to be placed on one of the physical machines. If not, the placement module can specify that tags be generated for the virtual machine, at 810. The placement module can issue a command to a tagging module, e.g., tagging module 172 of FIG. 1, instructing the tagging module to generate tags for the virtual machine that is to be placed. Once tags have been generated for the virtual machine, the tagging module can send the tags to the placement module. The tagging module can send the tags in response to completing generation of one or more of the tags, or in response to a request by the placement module for the tags. The placement module can store the tags in a list of tags for the virtual machine, e.g., in placement data 128 of FIG. 1.

At 815, the placement module can select a physical machine of a number of physical machines that are available for the virtual machine to be placed on. The placement module maintains a list, e.g., in placement data 128 of FIG. 1, of available physical machines. In an embodiment, the placement module selects the first physical machine in the list and then proceeds through the list linearly. The placement module calculates a number of common entries at 820. This involves detecting whether a tag that is identified in the tag information as being present for the virtual machine is also present in a list of tags in the information for the selected physical machine. If the tag is included in both lists, the placement module increments a counter, indicating a common entry was found. The placement module compares each tag for the virtual machine with the tags for the physical machine and increments the counter each time the virtual machine's tag is also found in the list for the physical machine. In this way, the placement module calculates the total number of common entries, or tags found for both the physical machine and the virtual machine. The placement module stores this number, e.g., as a counter value such as CPM1 340 of FIG. 3B, at 825.

At 830, the placement module detects whether more physical machines are available. If so, the process returns to 815, where the placement module selects the next physical machine. Otherwise, the placement module detects which counter value is the highest at 835. The highest counter identifies the physical machine with the highest number of common entries. The placement module selects this physical machine to act as host for the virtual machine.

Figure 9:
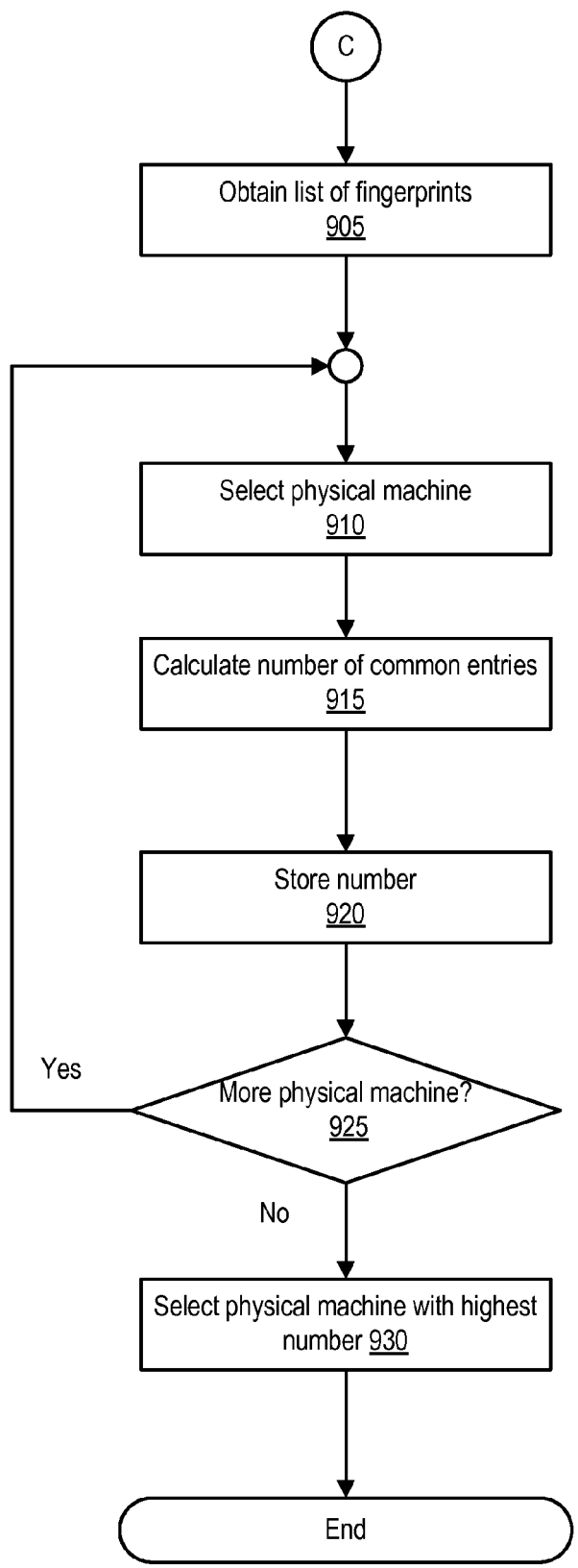
FIG. 9 is a flowchart illustrating additional details of a method of placing a virtual machine on a physical machine using fingerprint information, according to one embodiment of the present invention.

FIG. 9 is a flowchart illustrating additional details of a method of placing a virtual machine on a physical machine. If the placement module detects that fingerprint data is available, the placement module obtains the fingerprint data at 905. The fingerprint data can be available, e.g., as a result of having been generated by a fingerprint module such as fingerprint module 162 of FIG. 1. The placement module can send a request to the fingerprint module specifying that the fingerprint module should transmit fingerprint data for a given virtual machine to the placement module. Alternatively, the fingerprint module can be configured to automatically transmit the fingerprint data to the placement module in response to generating the fingerprint data. The fingerprint data can include a list of fingerprints that identifies data, e.g., chunks or pages, associated with a virtual machine being placed. The data can be a part of the virtual machine image and/or other related data.

At 910, the placement module selects a physical machine of a number of physical machines that are available for the virtual machine to be placed on. The placement module maintains a list, e.g., in placement data 128 of FIG. 1, of available physical machines. In an embodiment, the placement module selects the first physical machine in the list and then proceeds through the list linearly. The placement module calculates a number of common entries at 915. This involves detecting whether a fingerprint that is identified in the fingerprint information as being present for the virtual machine is also present in a list of fingerprints in the information for the selected physical machine. If the fingerprint is included in both lists, the placement module increments a counter. The placement module compares each fingerprint for the virtual machine with the fingerprints for the physical machine and increments the counter each time the virtual machine's fingerprint is also found in the list for the physical machine. In this way, the placement module calculates the total number of common entries, or fingerprints found for both the physical machine and the virtual machine. The placement module stores this number, e.g., as a counter value such as CPM1 340 of FIG. 3B, at 920.

At 925, the placement module detects whether more physical machines are available. If so, the process returns to 910, where the placement module selects the next physical machine. Otherwise, the placement module detects which counter value is the highest at 930. The highest counter identifies the physical machine with the highest number of common entries. The placement module selects this physical machine to act as host for the virtual machine.

Returning to FIG. 4, once a physical machine has been selected, the placement module deploys the virtual machine on the selected physical machine at 425. In an embodiment, this involves copying the virtual machine from a storage device, storing the virtual machine on the selected physical machine, and executing a command that causes the virtual machine to begin execution. In the case where a virtual machine is being migrated, the placement module instead copies the virtual machine from the physical machine that is running the virtual machine to the selected virtual machine and causes the virtual machine to begin execution.

Once the virtual machine is running on the target physical machine, the placement module enables memory monitoring of the virtual machine at 430. This involves the placement module detecting whether dynamic placement is desired. If so, the placement module can instruct the target physical machine on which the virtual machine has been provisioned to monitor and record all pages the virtual machine requests. The target physical machine can track this information, e.g., by creating and storing fingerprints for such pages. This target physical machine can send this information to the placement module for use in placement operations.

Figure 10:
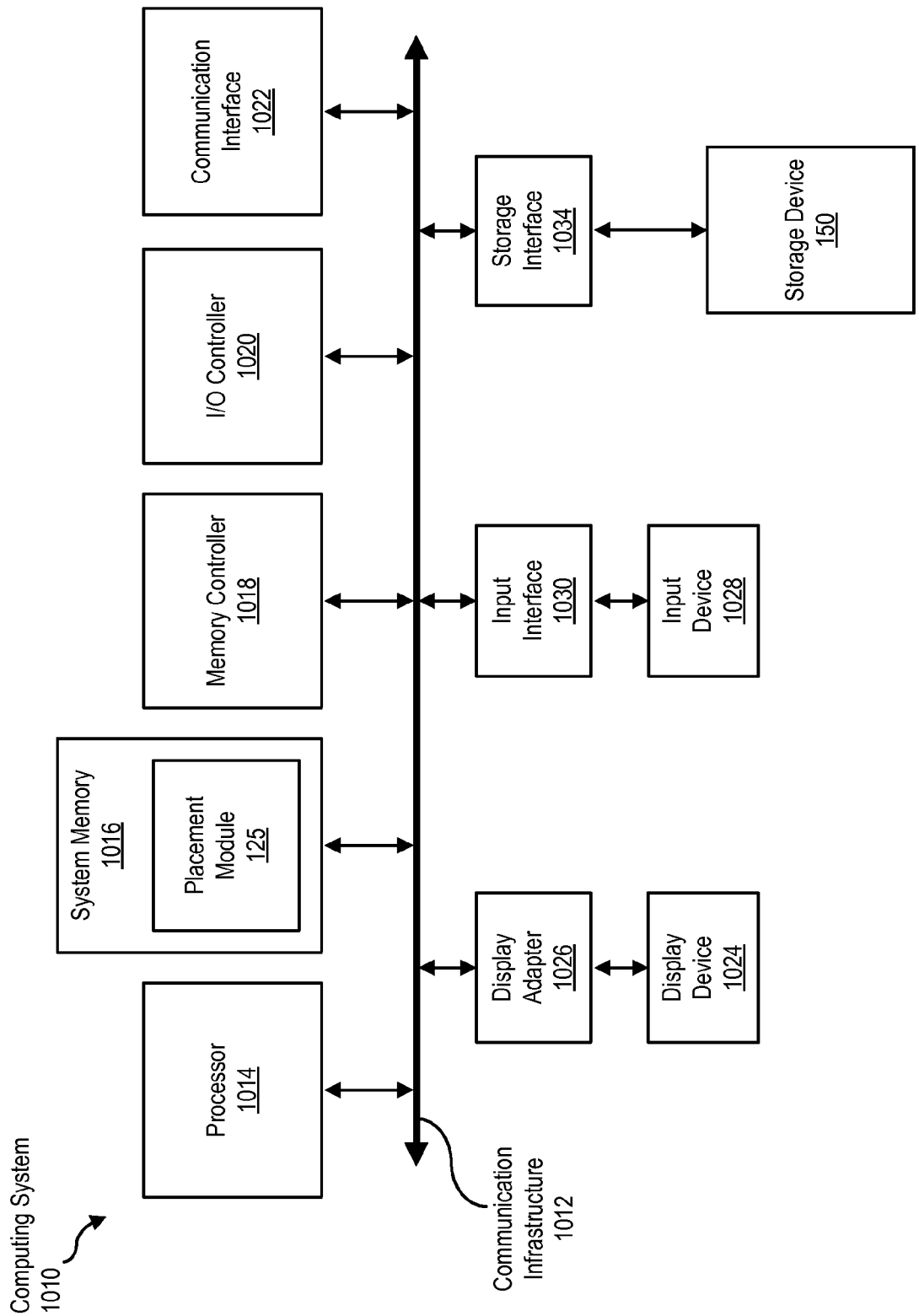
FIG. 10 is a block diagram of a computing device, illustrating how a placement module that selects one of several available physical machines can be implemented in software, according to one embodiment of the present invention.

FIG. 10 is a block diagram of a computing device, illustrating how a placement module that selects one of several available physical machines can be implemented in software. Computing system 1010 broadly represents any single or multi-processor computing device or system capable of executing computer-readable instructions. Examples of computing system 1010 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1010 may include at least one processor 1014 and a system memory 1016. By executing the software that implements a placement module 125, computing system 1010 becomes a special purpose computing device that is configured to perform placement operations relating to placing virtual machines on physical machines based on in-memory deduplication information.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the embodiments described and/or illustrated herein. For example, processor 1014 may perform and/or be a means for performing the operations described herein. Processor 1014 may also perform and/or be a means for performing any other operations, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may include both a volatile memory unit (such as, for example, system memory 1016) and a non-volatile storage device (such as, for example, primary storage device 150, as described in detail below). In one example, program instructions executable to implement a placement module 125 (e.g., as shown in FIG. 1) may be loaded into system memory 1016.

In certain embodiments, computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller 1018 may perform and/or be a means for performing, either alone or in combination with other elements, one or more of the operations or features described and/or illustrated herein.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 10100, and storage interface 10104.

Communication interface 1022 broadly represents any type or form of communication device or adapter capable of facilitating communication between computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11094 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, computing system 1010 may also include at least one input device 1028 coupled to communication infrastructure 1012 via an input interface 1030. Input device 1028 generally represents any type or form of input device capable of providing input, either computer or human generated, to computing system 1010. Examples of input device 1028 include, without limitation, a keyboard, a pointing device, a speech recognition device, or any other input device.

As illustrated in FIG. 10, computing system 1010 may also include a storage device 150 coupled to communication infrastructure 1012 via a storage interface 10104. Storage device 150 generally represents any type or form of storage device or medium capable of storing data and/or other computer-readable instructions. For example, storage device 150 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage device 150 and other components of computing system 1010. A storage device like storage device 150 can store information such as deduplication signatures, application data, and/or virtual machine images.

In certain embodiments, storage device 150 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 150 may also include other similar structures or devices for allowing computer software, data, or other computer-readable instructions to be loaded into computing system 1010. For example, storage device 150 may be configured to read and write software, data, or other computer-readable information. Storage device 150 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10.

Computing system 1010 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1010 for storage in memory via a network such as the Internet or upon a carrier medium.

The computer-readable medium containing the computer program may be loaded into computing system 1010. All or a portion of the computer program stored on the computer-readable medium may then be stored in system memory 1016 and/or various portions of storage device 150. When executed by processor 1014, a computer program loaded into computing system 1010 may cause processor 1014 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1010 may be configured as an application specific integrated circuit (ASIC) adapted to implement one or more of the embodiments disclosed herein.

Figure 11:
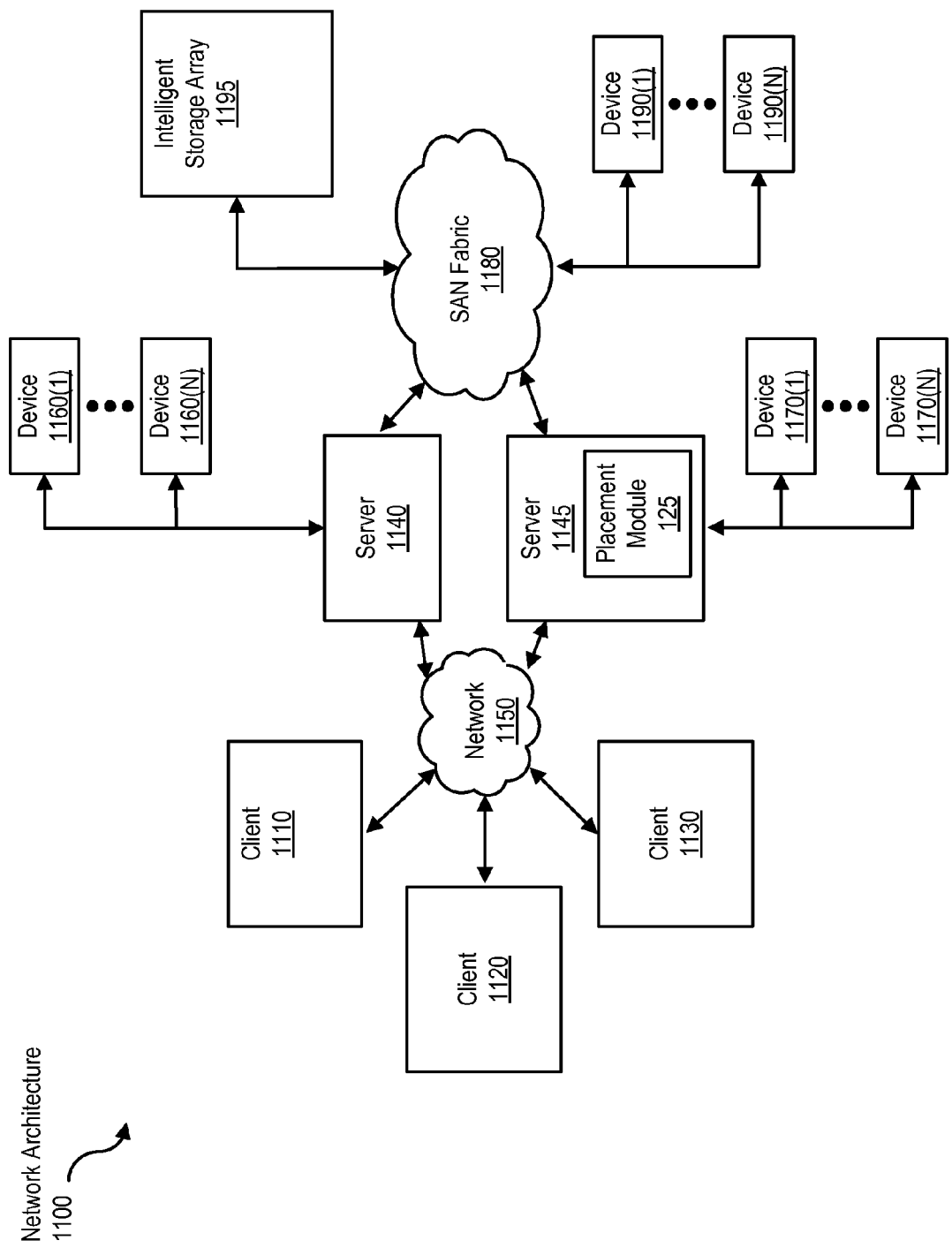
FIG. 11 is a block diagram of a networked system, illustrating how various computing devices can communicate via a network, according to one embodiment of the present invention.

FIG. 11 is a block diagram of a network architecture 1100 in which client systems 1110, 1120, and 1130 and servers 1140 and 1145 may be coupled to a network 1150. Client systems 1110, 1120, and 1130 generally represent any type or form of computing device or system, such as computing system 1010 in FIG. 10.

Similarly, servers 1140 and 1145 generally represent computing devices or systems, such as application servers or database servers, configured to provide various database services and/or run certain software applications. Network 1150 generally represents any telecommunication or computer network including, for example, an intranet, a wide area network (WAN), a local area network (LAN), a personal area network (PAN), or the Internet. In one example, one or more of client systems 1110, 1120, and/or 1130 may include a placement module 125 as shown in FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent network-attached storage (NAS) devices configured to communicate with servers 1140 and 1145 using various protocols, such as Network File System (NFS), Server Message Block (SMB), or Common Internet File System (CIFS). Such storage devices can store deduplication signatures, backup images and/or backup catalogs, as described above.

Servers 1140 and 1145 may also be connected to a storage area network (SAN) fabric 1180. SAN fabric 1180 generally represents any type or form of computer network or architecture capable of facilitating communication between multiple storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170 (1)-(N), storage devices 1190(1)-(N) and intelligent storage array 1195 generally represent any type or form of storage device or medium capable of storing data and/or other computer-readable instructions.

In certain embodiments, and with reference to computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the embodiments disclosed herein may also be encoded as a computer program, stored in server 1140, run by server 1145, and distributed to client systems 1110, 1120, and 1130 over network 1150.

In some examples, all or a portion of one of the systems in FIGS. 1, 10, and 11 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a placement module may transform the behavior of a placement server such that a physical machine's performance is less negatively impacted due to implementing additional virtual machines on the physical machine.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method comprising:
  generating a list, wherein
    the list comprises a plurality of entries associated with a virtual machine,
    the virtual machine is a new virtual machine that is not running when the list is generated,
    the generating the list comprises
    predicting portions of data likely to be used by the virtual machine based on metadata that includes information identifying one or more characteristics of the virtual machine, and each entry indicates a respective portion of data associated with the virtual machine;
  for each candidate list of a plurality of candidate lists, calculating a number of common entries, wherein each candidate list comprises a plurality of entries, and a common entry is an entry that is included in the respective candidate list and in the list;
  selecting a target candidate list of the plurality of candidate lists, wherein the target candidate list has the highest number of common entries of the plurality of candidate lists,
  an entry in the target candidate list identifies a portion of data associated with a second virtual machine, generating the entry comprises
  trapping a memory call made by a second virtual machine, wherein the memory call identifies a requested portion of data, and
  calculating a fingerprint for the requested portion of data, wherein the entry comprises the fingerprint;
  the second virtual machine is implemented on a computing device associated with the target candidate list; and
  assigning the virtual machine to the computing device associated with the target candidate list.

2. The method of claim 1, further comprising generating tags based on applications associated with the virtual machine, wherein the entries comprise the tags.

3. The method of claim 1, further comprising:
  receiving information identifying the common entries, wherein
    the common entries identify shared locations in a storage device,
    the shared locations are shared by the virtual machine and another virtual machine.

4. The method of claim 1, further comprising:
dividing the virtual machine into chunks;
generating a fingerprint for each chunk, wherein
each entry comprises one of the fingerprints.

5. The method of claim 1, wherein
each respective portion of data comprises a page in a random access memory.

6. A non-transitory computer readable storage medium comprising program instructions executable to:
generate a list, wherein the list comprises a plurality of entries associated with a virtual machine,
the virtual machine is a new virtual machine that is not running when the list is generated,
generating the list comprises predicting portions of data likely to be used by the virtual machine based on metadata that includes information identifying one or more characteristics of the virtual machine, and each entry indicates a respective portion of data associated with the virtual machine;
for each candidate list of a plurality of candidate lists, calculate a number of common entries, wherein each candidate list comprises a plurality of entries, and
a common entry is an entry that is included in the respective candidate list and in the list;
select a target candidate list of the plurality of candidate lists, wherein the target candidate list has the highest number of common entries of the plurality of candidate lists,
an entry in the target candidate list identifies a portion of data associated with a second virtual machine,
generating the entry comprises trapping a memory call made by a second virtual machine, wherein the memory call identifies a requested portion of data, and
calculating a fingerprint for the requested portion of data, wherein the entry comprises the fingerprint;
the second virtual machine is implemented on a computing device associated with the target candidate list; and
assign the virtual machine to the computing device associated with the target candidate list.

7. The non-transitory computer readable storage medium of claim 6, wherein the program instructions are further executable to:
generate tags based on applications associated with the virtual machine, wherein the entries comprise the tags.

8. The non-transitory computer readable storage medium of claim 6, wherein
the common entries identify shared locations in a storage device,
the shared locations are shared by the virtual machine and another virtual machine.

9. A system comprising:
one or more processors; and
a memory coupled to the one or more processors, wherein the memory stores program instructions executable to:
generate a list, wherein the list comprises a plurality of entries associated with a virtual machine, the virtual machine is a new virtual machine that is not running when the list is generated,
generating the list comprises predicting portions of data likely to be used by the virtual machine based on metadata that includes information identifying one or more characteristics of the virtual machine, and each entry indicates a respective portion of data associated with the virtual machine;
for each candidate list of a plurality of candidate lists, calculate a number of common entries, wherein each candidate list comprises a plurality of entries, and
a common entry is an entry that is included in the respective candidate list and in the list;
select a target candidate list of the plurality of candidate lists, wherein the target candidate list has the highest number of common entries of the plurality of candidate lists,
an entry in the target candidate list identifies a portion of data associated with a second virtual machine,
generating the entry comprises
trapping a memory call made by a second virtual machine, wherein the memory call identifies a requested portion of data, and
calculating a fingerprint for the requested portion of data, wherein the entry comprises the fingerprint;
the second virtual machine is implemented on a computing device associated with the target candidate list; and
assign the virtual machine to the computing device associated with the target candidate list.

10. The system of claim 9, wherein the program instructions are further executable to:
generate tags based on applications associated with the virtual machine, wherein the entries comprise the tags.

11. The system of claim 9, wherein
the common entries identify shared locations in a storage device,
the shared locations are shared by the virtual machine and another virtual machine.

\* \* \* \* \*